United States Patent [19]

Maudal

[11] 4,044,970
[45] Aug. 30, 1977

[54] INTEGRATED THRUST VECTOR AERODYNAMIC CONTROL SURFACE

[75] Inventor: Inge Maudal, Claremont, Calif.

[73] Assignee: General Dynamics Corporation, Pomona, Calif.

[21] Appl. No.: 603,218

[22] Filed: Aug. 8, 1975

[51] Int. Cl.² .............................................. F42B 15/18
[52] U.S. Cl. ................................................. 244/3.22
[58] Field of Search .............................. 244/3.21, 3.22

[56] References Cited

U.S. PATENT DOCUMENTS

| 3,013,494 | 12/1961 | Chanut | 244/3.22 |
| 3,164,338 | 1/1965 | Cooper et al. | 244/3.22 |
| 3,276,376 | 10/1966 | Cubbison et al. | 244/3.22 |
| 3,286,956 | 11/1966 | Nitikman | 244/3.22 |

Primary Examiner—Verlin R. Pendegrass
Attorney, Agent, or Firm—Henry M. Bissell; Edward B. Johnson

[57] ABSTRACT

A missile is disclosed on which constant burning thrust reaction motors are provided integral with the tail panels of the missile to enhance the effect thereof, particularly during the boost phase of flight. The motors provide thrust along the chord of the tail panel and are moved about the axis of rotation of the tail panel by the servo motor associated therewith. The servo motors are activated by central missile control circuitry.

6 Claims, 4 Drawing Figures

INTEGRATED THRUST VECTOR AERODYNAMIC CONTROL SURFACE

BACKGROUND OF THE INVENTION

1. Field of the Invention

The present invention relates to missile control and propulsion systems and more particularly, to a control system for such involving both reaction and aerodynamics control forces.

2. Description of the Prior Art

Conventional missiles include tail panels mounted for motion about axes generally perpendicular to the axis of the body of the missile. Servo motors are associated with each panel to cause rotation of the panel about its axis. The servo motors are activated by central missile control circuitry. During flight of the missile along a path collinear with the axis of the body of the missile, the tail panels are positioned with their chords parallel with the path of flight. In this position aerodynamic forces acting on the tail panels do not tend to change the attitude of the missile. When an attitude change is required, the tail panels are rotated with respect to the axis of the missile body and therefore with respect to the windstream. The aerodynamic forces applied to the missile by the windstream striking the tail panel surfaces includes a component of force perpendicular to the axis of the missile body which provides the moment necessary to turn the missile. The coordinated positioning of the tail panels by the control circuitry can thereby be utilized to control the attitude and path of flight of the missile.

The boost phase of a typical missile is characterized by very low tail panel effectiveness. To ensure a safe launch and compensate for the reduced effectiveness of the control surfaces, missiles are conventionally ballasted at launch to yield an aerodynamically stable air frame. This results in more than necessary aerodynamic stability after booster burnout with correspondingly reduced pay load capacity and roll-yaw coupling problems during early maneuvering.

One known method of improving boost phase control is to complement the aerodynamic control system with a reaction control system in which the thrust of a reaction motor, such as a jet engine, is used to provide the moment necessary to turn the missile. Presently known reaction control systems for missiles require separate reaction motors for all three missile control channels; pitch, yaw and roll. To provide control, the reaction motors must each have its own servo motor positioning system or be of the controlled thrust variety. Both configurations are limited in their practical usefulness because of the expense and/or complexity of each.

Various examples of pertinent prior art of which the applicant is aware may be found in the following U.S. Pat. Nos. 2,086,545 of Fator; 3,064,419 of Ward; 3,114,520 of Finvold; 3,166,273 of Balluff; and 3,258,916 of Lehmann.

SUMMARY OF THE INVENTION

Arrangements in accordance with the present invention employ relatively inexpensive, constant-burning reaction motors integral with each tail panel to improve the control effectiveness thereof, especially during the boost phase of flight of the missile. Without tail panel incidence the thrust of the control reaction motors merely provides additional propulsion for the missile along the axis of its body in concert with the main missile propulsion system. Control in each missile channel is obtained by positioning the tail panels about their axes of rotation by the existing servo drives. As a result, integrated reaction/aerodynamic control may be incorporated in presently-designed tactical ballistic missiles with minimum hardware changes and therefore at minimum cost.

Utilization of such an integrated reaction/aerodynamic control system during the boost phase permits launch with an aerodynamically unstable airframe. In the case of an end-burning rocket motor, this permits a neutrally stable air frame after motor burnout. With such a neutrally-stable airframe, the payload capability of a missile may be increased in the range of 50% to 100%. Boost phase reaction control also permits missile turning during boost phase, since controllability of roll-yaw coupling is achieved. This is an important feature for a fast-reaction missile system and is of particular importance in a vertically-launched vehicle.

BRIEF DESCRIPTION OF THE DRAWINGS

A better understanding of the present invention may be had from a consideration of the following detailed description, taken in conjunction with the accompanying drawings, in which.

DETAILED DESCRIPTION OF THE PREFERRED EMBODIMENT

Figure 1:
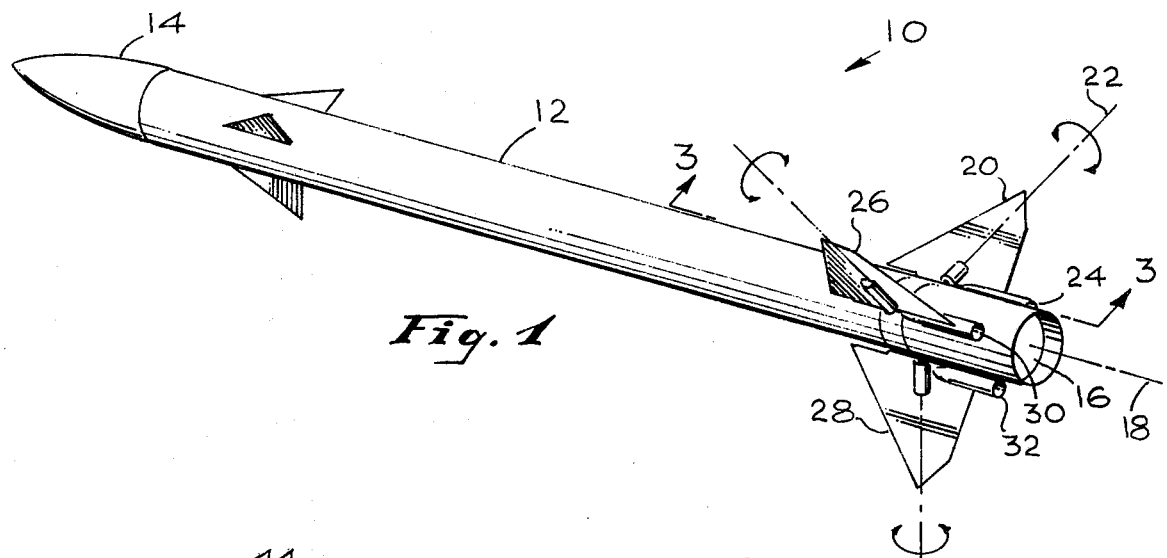
FIG. 1 is a sketch of a missile including reaction motors integral with the tail panels thereof according to the invention.

FIG. 1 is a sketch of a missile 10 according to the invention in which cylindrical missile body 12 includes payload compartment or warhead 14 at one end thereof and main missile propulsion means such as rocket engine 16 at the other end. The axis of cylindrical body 12 is shown as axis line 18. Engine 16 provides thrust collinear with axis 18.

Tail panel 20 is mounted to body 12 for rotation about axis 22. Tail panel 20 includes integral therewith a reaction motor such as rocket engine 24. Motor 24 may be a self-contained rocket engine or a nozzle connected to another source of gas under high pressure such as main propulsion engine 16. In either case it is only necessary that motor 24 mounted to panel 20 or integral therewith so that the thrust of motor 24 is collinear with the aerodynamic chord of panel 20. Tail panels 26 and 28 including motors 30 and 32, respectively, integral therewith, are mounted to body 12 for rotation in the same manner as panel 20.

Figure 2:
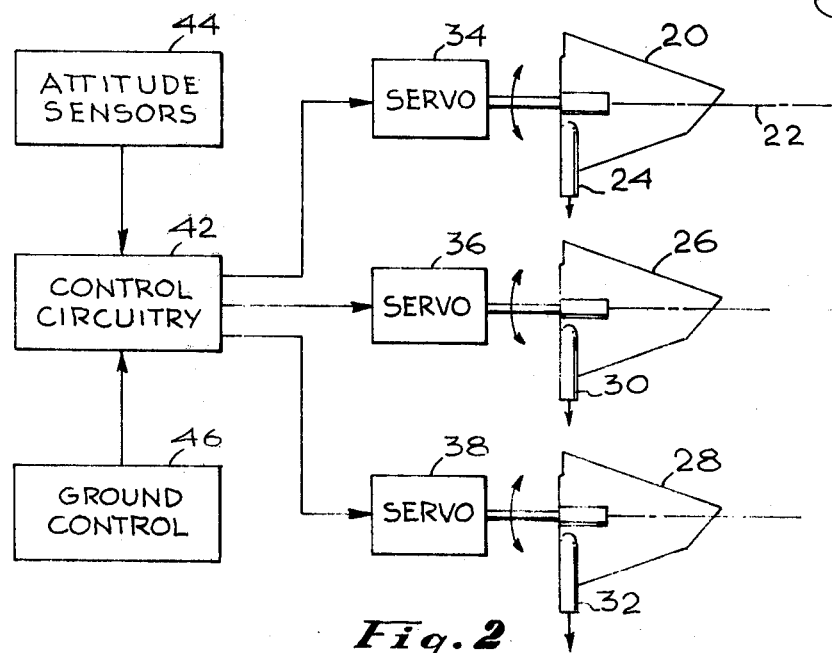
FIG. 2 is a schematic representation of the missile control system of the missile shown in FIG. 1.

As shown in FIG. 2, tail panels 20, 26, and 28 are controlled by servo motors 34, 36, and 38, respectively, which are mounted to or in body 12. Activation of servo 34, for example, causes rotation of tail panel 20, and therefore motor 24, about axis 22. The other panels are moved in the same manner. The missile 10 is shown herein with three tail panels mounted equidistantly about the circumference of the lower portion of body 12. but a different arrangement of tail panels may easily be utilized if required by the particular type of missile or situation involved.

Figure 3:
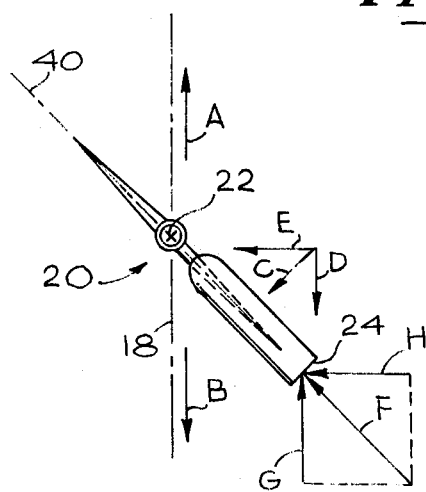
FIG. 3 is a sectional view of one of the tail panels of FIG. 1 taken along section line 3—3 after positioning by a servo motor in order to turn the missile.

The effect of rotation of a tail panel on the path of flight of missile 10 may be understood with reference to FIG. 3 which is a sectional view of panel 20 taken along line 3—3 in FIG. 1 after rotation of the panel by servo 34. The direction of flight is shown by arrow A, along axis 18, and the thrust of engine 16 by arrow B. Arrow B also shows the direction of the relative windstream. The windstream force, arrow C, acting on panel 20 is normal to the surface thereof and therefore perpendicular to the chord of the panel which extends along line 40. The components of force C are shown as drag force D which acts to slow the missile down, and sideways force component E which acts through the point of axis 22 to apply a moment to body 12 tending to cause missile 10 to rotate about an axis extending through the center of rotation (not depicted) of the missile. It is obvious that the coordinated rotation of panels 20, 26 and 28 may be used to control the path of flight of missile 10 as long as the sideways component of force E is significant. This type of aerodynamic control is notoriously ineffective at low airspeeds, i.e. during the boost phase of launch because of the relatively small aerodynamic force C. This low tail panel effectiveness may be partially compensated for in control circuitry 42 shown in FIG. 2, which can increase the amount of rotation of the panels about their respective axes during boost. Problems of response time and limited travel limit the effectiveness of such compensation. In any event, control circuitry 42 activates the servos in response to information or commands provided by attitude sensors 44 within the missile and ground control circuitry 46 which may be partially outside the missile.

Referring again to FIG. 3, the aerodynamic force achieved by rotation of panel 20 with respect to the relative wind is enhanced by the action of continuously burning thrust reaction motor 24. The thrust of motor 24 is along chord line 40 and is shown as force F. The components of force F are additional propulsion force G, which supplements the thrust of main propulsion means 16, and sideways thrust component H, which applies a reaction force to body 12, similar to aerodynamic force component E in order to apply a moment to body 12 to alter the flight path of the missile.

Since motors 24, 30 and 32 (FIG. 2) act along the chords of panels 20, 26, and 28, control circuitry 42 controls the moments applied by both the aerodynamic and reaction control systems at the same time without the need for additional control circuitry specifically directed to controlling the reaction motors. The dual control systems, advantageously positioned under the control of the common control circuitry and servo motor, serve to complement each other in operation. At low speeds, and therefore low aerodynamic forces, the reaction motors provide the necessary thrust to control direction of the missile as the panels are rotated for that purpose. As speed builds up, and thereby the aerodynamic forces increase to a level where they are adequate for missile direction control, the reaction forces are no longer needed and may be cut down or dispensed with (as by burn-out).

Figure 4:
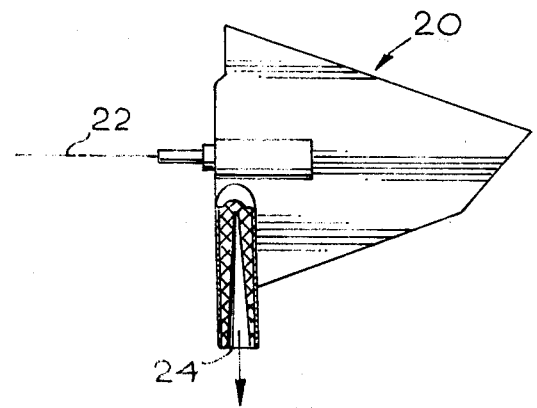
FIG. 4 is a view; partially broken away, showing a further aspect of the invention.

FIG. 4 illustrates an arrangement by which the last-mentioned effect may be achieved. In this side view of the panel 20, rotatable about an axis 22 under the control of control circuitry 42 as described above in connection with FIG. 2, the reaction motor 24 is shown as a tapered charge so shaped as to reduce the level of thrust as a function of burn time. This reduction of thrust is complementary to the build-up of aerodynamic control force as the missile increases speed with time after launch, thus serving to maintain the control forces more constant for a given attitude of the panel or vane 20 under the influence of the associated servo motor 34 and control circuitry 42. By virtue of this aspect of the invention, control stability is enhanced and the demands on the overall control system are reduced.

Although there have been described above specific arrangements of an integrated thrust vector aerodynamic control surface in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:
1. A missile comprising:
   a cylindrical missile body;
   main propulsion means acting along the axis of the body to propel the missile;
   a plurality of tail panels pivotably mounted to and exteriorly of the body and pivotable about an axis normal to the cylindrical surface of the body, for aerodynamically controlling direction of the missile in flight;
   a servo motor associated with each tail panel for controlling the angular position of the tail panel relative to the missile body;
   control circuitry for activating the servo motors to control the flight of the missile; and
   a continuously burning reaction thrust motor integral with and mounted in each tail panel and rotatable therewith for providing thrust along the chord thereof enhancing the aerodynamic control of the missile, and for developing rotational forces on the body in the absence of aerodynamic forces.
2. The missile of claim 1 wherein the reaction thrust motor is shaped to vary the level of thrust as a function of time after ignition.
3. The missile of claim 2 wherein the thrust motor is shaped to decrease the level of thrust as a function of time after ignition.
4. The missile of claim 1 wherein the thrust motor is shaped to complement the aerodynamic forces on the associated tail panel so as to reduce the level of thrust as the aerodynamic forces increase.
5. In conjunction with an improved missile control system for controlling the flight of a missile about pitch, roll and yaw axes of the type having a plurality of tail panel surfaces externally mounted to control the guidance of the missile in flight, servo motor control means coupled to the tail panel surfaces to control the angular position thereof, and control circuitry for operating the servo motor means, the improvement comprising:
   a continuously burning thrust reaction motor mounted in each tail panel surface to provide a reaction force along the surface with a component of thrust generally transverse to the flight axis of the missile.
6. A system in accordance with claim 5 wherein the reaction motor is movable by the associated tail panel servo motor means so as to develop thrust in a direction determined by the servo motor means and the control circuitry.

* * * * *